United States Patent
Barnetson et al.

(10) Patent No.: US 9,468,054 B2
(45) Date of Patent: Oct. 11, 2016

(54) RETROFIT LED LIGHTING SYSTEM WITH CIRCUIT LEVEL ENHANCEMENT

(71) Applicant: Lunera Lighting, Inc., Anaheim, CA (US)

(72) Inventors: Don Barnetson, San Jose, CA (US);
Joel Snook, Grass Valley, CA (US);
Junyun Wang, Palo Alto, CA (US);
Ardeshir Esmaeili, San Jose, CA (US)

(73) Assignee: LUNERA LIGHTING, INC., Santa Clara, CA (US)

( * ) Notice: Subject to any disclaimer, the term of this patent is extended or adjusted under 35 U.S.C. 154(b) by 0 days.

(21) Appl. No.: 14/300,235

(22) Filed: Jun. 10, 2014

(65) Prior Publication Data

US 2015/0359059 A1     Dec. 10, 2015

(51) Int. Cl.
*H05B 33/08*     (2006.01)

(52) U.S. Cl.
CPC ...... *H05B 33/0824* (2013.01); *H05B 33/0812* (2013.01); *H05B 33/0815* (2013.01); *H05B 33/0818* (2013.01)

(58) Field of Classification Search
None
See application file for complete search history.

(56) References Cited

U.S. PATENT DOCUMENTS

| | | | |
|---|---|---|---|
| 7,649,322 B2* | 1/2010 | Neuman et al. | 315/185 S |
| 7,906,917 B2* | 3/2011 | Tripathi et al. | 315/291 |
| 8,072,152 B2* | 12/2011 | Neuman et al. | 315/185 R |
| 8,373,547 B2 | 2/2013 | Benya | |
| 8,638,045 B2 | 1/2014 | Kunst | |
| 9,028,105 B2* | 5/2015 | Barnetson et al. | 362/294 |
| 9,033,545 B2* | 5/2015 | Barnetson et al. | 362/249.02 |
| 9,060,396 B2* | 6/2015 | Huang | |
| 2008/0019113 A1 | 1/2008 | Smith | |
| 2011/0169411 A1* | 7/2011 | Inoue et al. | 315/82 |
| 2012/0081032 A1* | 4/2012 | Huang | 315/294 |
| 2012/0229044 A1 | 9/2012 | Nerone | |
| 2013/0113375 A1 | 5/2013 | Leung | |
| 2013/0293122 A1 | 11/2013 | Huynh | |
| 2013/0342129 A1* | 12/2013 | Vaughan | 315/240 |
| 2014/0320007 A1* | 10/2014 | Stamm et al. | 315/51 |

* cited by examiner

*Primary Examiner* — Vibol Tan
(74) *Attorney, Agent, or Firm* — Henry J. Cittone; Cittone & Chinta LLP

(57) ABSTRACT

A light emitting diode retrofit lamp for replacement of fluorescent lamp or tube driven by fluorescent ballast is provided. The retrofit lamp consists of an enhanced circuit that overcomes the compatibility issues with the fluorescent ballasts. The circuit of the retrofit lamp comprises a deflickerizer circuit that prevents the flicker in the lamp when the lamp operates in the frequency range of 0.1 Hz to 60 Hz. The deflickerizer circuit further provides a method to align frequency with the ballast frequency and maintains phase to avoid low frequency interference.

15 Claims, 3 Drawing Sheets

US 9,468,054 B2

RETROFIT LED LIGHTING SYSTEM WITH CIRCUIT LEVEL ENHANCEMENT

FIELD OF THE INVENTION

The present invention relates to a circuit level enhancement for retrofit light emitting diode (LED) lamps, and more particularly to a drive circuit for LED retrofit lamps to prevent flickering in the LED lamps operating on AC ballasts.

BACKGROUND

With the recent evolution in the lighting industry, the solid state lighting lamps based on LED technology are used to replace existing fluorescent and high intensity discharge (HID) lamps. However, the main concern for replacing the existing lamp with the LED lamp was the considerable labor costs involved in the installation, because people need to open the light fixture to disassemble the existing ballast, either it be an electronic one, or a magnetic one. To overcome this concern, various retrofit LED lamps were proposed and used that were compatible with the existing ballast, thus eliminating the need for a skilled person to remove part of the existing lighting fixtures. These retrofit LED lamps use a circuit with a bridge rectifier that converts the AC waveform generated by the electronic or magnetic ballast to the DC waveform for the LEDs. However there are certain compatibility issues with the LED retrofit lamp and a few models of electronic ballasts, especially with the older models.

The LED retrofit lamps are designed to reduce energy consumption and to pull less power from the ballast. The ballast is stable up to 30-50% of their designated load. However when the load is further reduced the power factor controller (PFC) circuit is unable to maintain stable DC bus and oscillations are introduced resulting in flickering of the lamp.

Another issue that arises is the presence of audible noise that comes from the magnetic ballast when the dimming of the LED array is carried out by the lamp circuit that operates at a frequency other than the mains AC frequency of 50 or 60 Hz.

In order to overcome the aforementioned incompatibility issues, the present invention provides an improved LED retrofit lamp with circuit level enhancement.

BRIEF SUMMARY OF THE INVENTION

In a first aspect of the present invention, a LED (light emitting diode) retrofit lamp with a deflickerizer circuit is provided. The deflickerizer circuit measures the current being delivered to the LED retrofit lamp and uses a FET (field-effect transistor) to short out the array with a PWM signal at approximately 1 kHz. The PWM (pulse-width modulation) circuit is able to adjust its duty cycle in real time in response to changes in ballast current and thus back out the visible flicker that would otherwise be seen by the observer.

In a second aspect of the present invention, a method for aligning phase and frequency to the ballast frequency is provided. When the deflickerizer circuit is used to dim the LED array, it is necessary to align frequency to the ballast frequency to avoid audible noise coming out of the ballast. Once frequency is aligned it is also necessary to maintain phase to avoid a low frequency interference wave which may show up as flicker to the user. The method comprises: completing an edge detection of the incoming waveform to measure frequency; calculating the required PWM duty cycle as a function of external dimming signal, temperature dimming and deflickerizer dimming; asserting the FET voltage for the required period in order to create the designed output level; repeating with each cycle of the magnetic ballast.

In a third aspect of the present invention, an enhanced circuit that enables reactive coupling of the LED retrofit lamp with the ballast is provided. For 60 kHz lamp, the enhanced circuit comprises a large inductive element 100 s of mH and for 25 kHz lamp, a capacitor at the input end.

BRIEF DESCRIPTION OF THE DRAWINGS

The preferred embodiment of the invention will hereinafter be described in conjunction with the appended drawings provided to illustrate and not to limit the scope of the invention, wherein like designation denote like element and in which.

DETAILED DESCRIPTION OF THE EMBODIMENTS

In the following detailed description of embodiments of the invention, numerous specific details are set forth in order to provide a thorough understanding of the embodiment of invention. However, it will be obvious to a person skilled in art that the embodiments of invention may be practiced with or without these specific details. In other instances well known methods, procedures and components have not been described in details so as not to unnecessarily obscure aspects of the embodiments of the invention.

Furthermore, it will be clear that the invention is not limited to these embodiments only. Numerous modifications, changes, variations, substitutions and equivalents will be apparent to those skilled in the art, without parting from the spirit and scope of the invention.

Embodiments of the present invention provide an enhanced circuit for LED retrofit lamp. The LED retrofit lamp is compatibility with all types of existing fluorescent and HID ballast. The enhanced circuit contains a deflickerizer circuit, a means for reactively coupling the LED lamp with the ballast and a means for aligning frequency during the deflickerizer dimming. The deflickerizer prevents the flicker generated in the ballast at 0.1 Hz to 60 Hz from being visually apparent at the LED lamp. The reactive coupling couples the lamp to the reference ballast so as to enable it to draw less power, less current and less voltage using a combination of capacitive and inductive sources.

Figure 1:
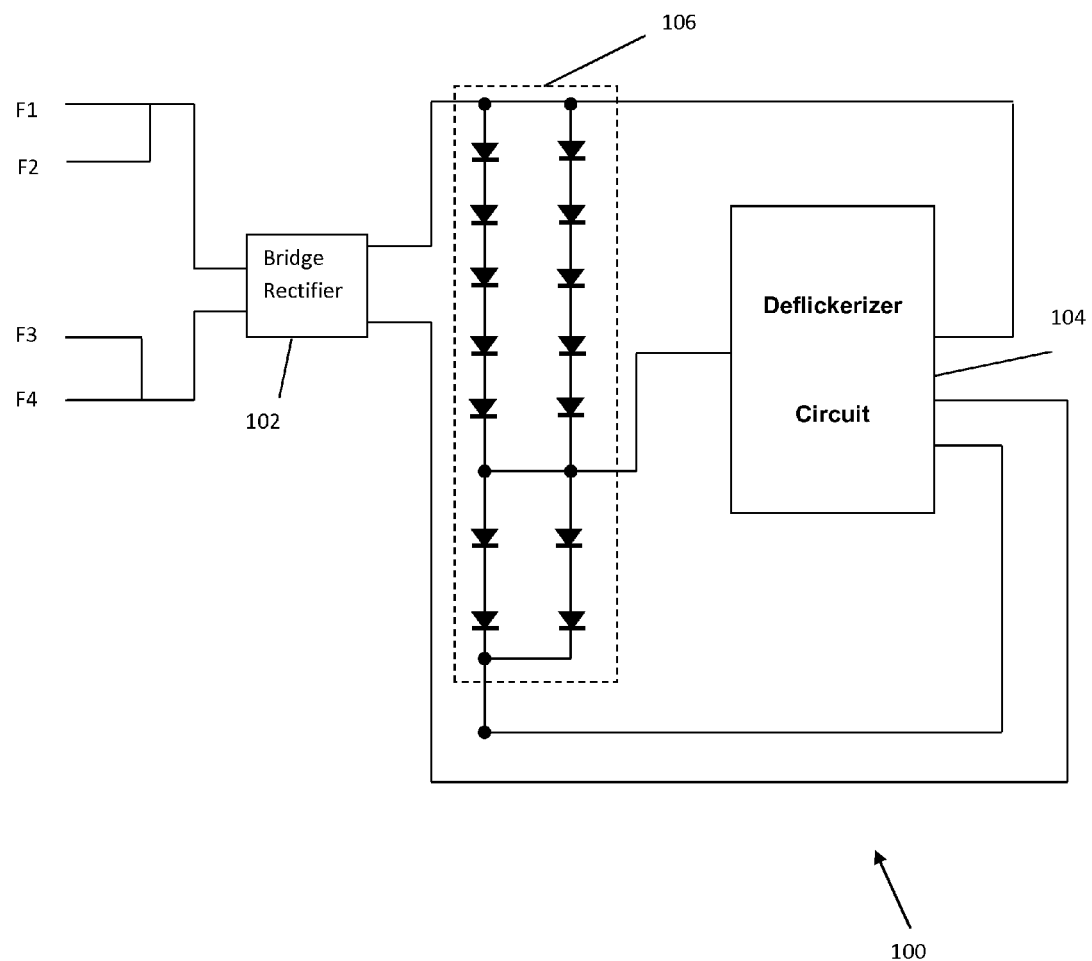
FIG. 1 illustrates a schematic representation of LED retrofit lamp with enhanced circuit component in accordance with an embodiment of the present invention.

FIG. 1 illustrates a schematic representation of LED retrofit lamp with enhanced circuit component in accordance with an embodiment of the present invention. The LED lamp has a plurality of pins F1, F2, F3 and F4 at the terminals of the lamp. The pluralities of pins are connected to the first terminal connection and second terminal connection of the ballast to draw the power from the ballast. The enhanced circuit 100 of the retrofit LED lamp comprises a bridge rectifier 102 connected to the plurality of pins and receives the input from AC (alternating current) ballast to convert the AC current to the DC (direct current) volt supply. In an embodiment, the bridge rectifier is made of schottky diodes. The electronic ballasts are typically made up of a two staged architecture. A front end which converts an incoming AC waveform to a high voltage DC constant voltage bus, then a back end which drives a constant current AC output using this bus as a source. The front end bus has active power factor control (PFC) to enable it to provide a high power factor (typically greater than 0.9) and low THD (total harmonic distortion) (typically <20%) to the AC circuit. However, this PFC circuit has a limited dynamic range. Since the LED retrofit lamp is designed for reduced energy consumption and thus pulling less power form the ballast, therefore the ballast has to provide output less than their designated load. Most ballasts are stable down to 30-50% of their designated load, but below this load, oscillations are introduced into the DC bus which flows through the AC output stage and appears as flicker in the range of 0.1 Hz to 60 Hz. To prevent these flickers a deflickerizer circuit 104 is provide in the LED retrofit lamp circuit. The deflickerizer 104 measures the current being delivered to the lamp and uses a FET to short out the LED array 106 with a PWM signal at approximately 1 kHz. The PWM circuit is able to adjust its duty cycle in real time in response to changes in ballast current and thus back out the visible flicker that would otherwise be seen by the observer.

Figure 2:
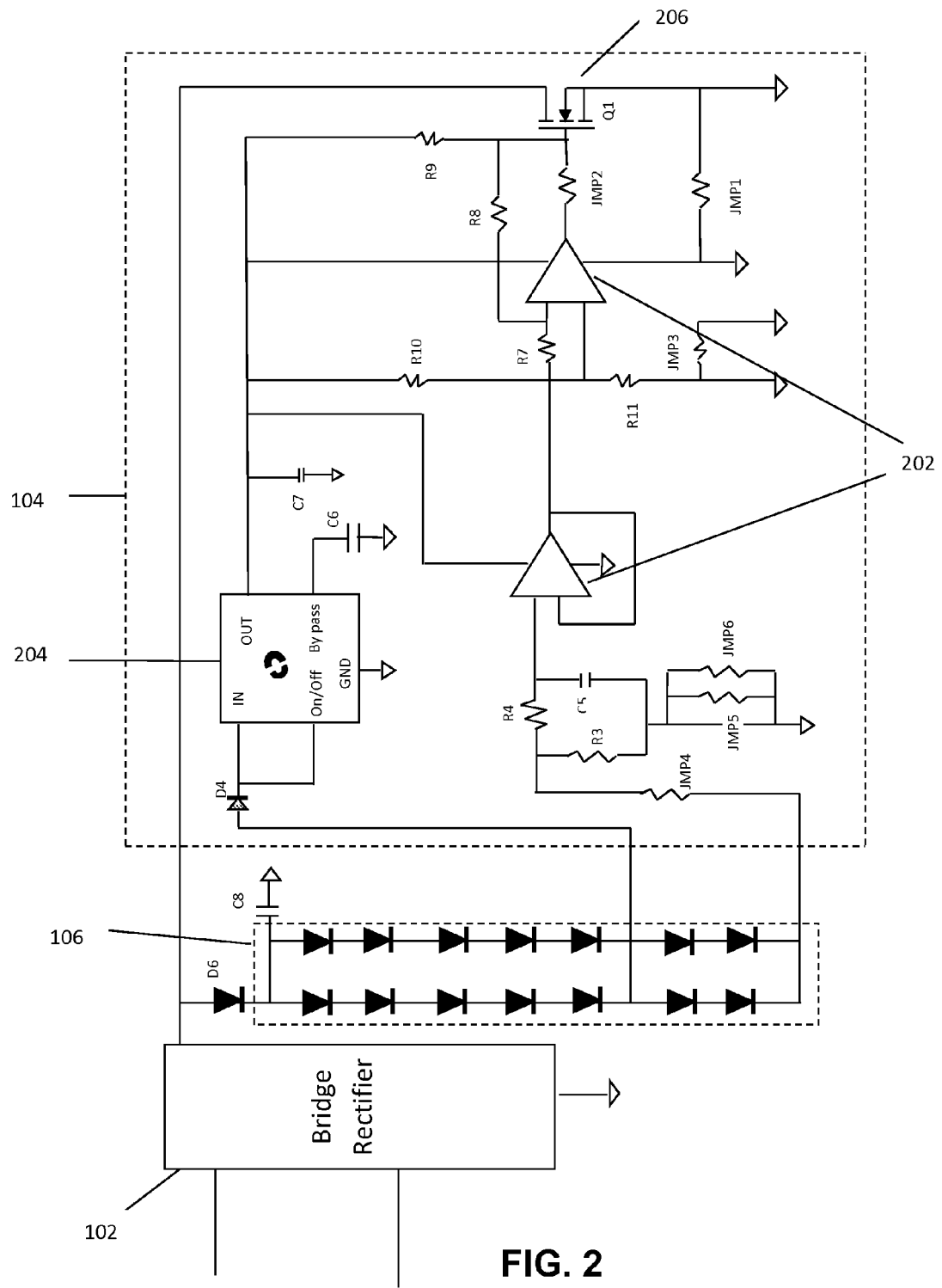
FIG. 2 illustrates a driving circuit for LED retrofit lamp with a deflickerizer circuit in accordance with an embodiment of the present invention.

FIG. 2 illustrates a circuit for LED retrofit lamp with a deflickerizer in accordance with an embodiment of the present invention. The AC ballast has a first bus having active power factor control (PFC) that enables it to provide a high power factor and low THD to the circuit. However LEDs are designed to consume less power and therefore less power is sourced out from the ballast that makes the PFC circuit unable to maintain stable bus and hence oscillations are introduced resulting in the flicker of the LED lamp. The deflickerizer circuit 104 comprises a plurality of operational amplifiers 202, a low drop out linear regulator 204 and a MOSFET (metal-oxide-semiconductor field-effect transistor) 206. A plurality of resistors and capacitors are also integrated in the circuit for providing the functionality to the deflickerizer circuit 104. The low dropout linear regulator 204 features low input voltage capability and adjustable low output voltage while exhibiting good PSRR and transient response. The LED retrofit lamp comprises a LED array 106 having a multiple string of LEDs arranged in a parallel. The LEDs string is short with the deflickerizer circuit 104 where the input from the shorted LED is feed into the low dropout linear regulator 204. The plurality of operational amplifier 202 generates a high output potential. Furthermore, the deflickerizer circuit 104 comprises a plurality of resistors and capacitors arranged in series or parallel with the low dropout linear regulator 204 and the pluralities of operational amplifiers 202. The deflickerizer circuit 104 measures the current being supplied to the array 106 by the ballast using the operational amplifiers 202 and the low dropout linear regulator 204. The deflickerizer circuit 104 after measuring the current being supplied to LED lamp uses the MOSFET 206 to short out the LED array 106 with a PWM signal at approximately 1 kHz. The PWM circuit is able to adjust its duty cycle in real time in response to changes in ballast current and thus back out the visible flicker that would otherwise be seen by the observer. Although this has been seen on older, programmed start ballasts, however this issue seems to be fundamental to any ballast with active PFC including: all fluorescent and HID electronic ballasts.

UL™ (Underwriters Laboratory™ a certification agency)) certifies LED replacement lamps as equivalent to the ANSI™ (standards agency) standard if the LED replacement lamp can operate within the power, current and voltage envelop of the lamp they are replacing. The lighting industry developed a series of reference ballasts to represent the performance of magnetic (60 Hz) and electronic (25 Hz) ballast. The reference ballast consists of a constant voltage source with a series resistance and reactance to attempt to replicate the performance of a more complex and varied system. The ANSI standard lamp can operate within the power, current and voltage envelop of the lamp they are replacing. In order to satisfy this requirement the lamp must be reactively coupled to the reference ballast to enable it to draw less power, less current and less voltage using a combination of capacitive and inductive sources. This is done by providing a reactive coupling to the input circuit of LED retrofit lamp.

Figure 3:
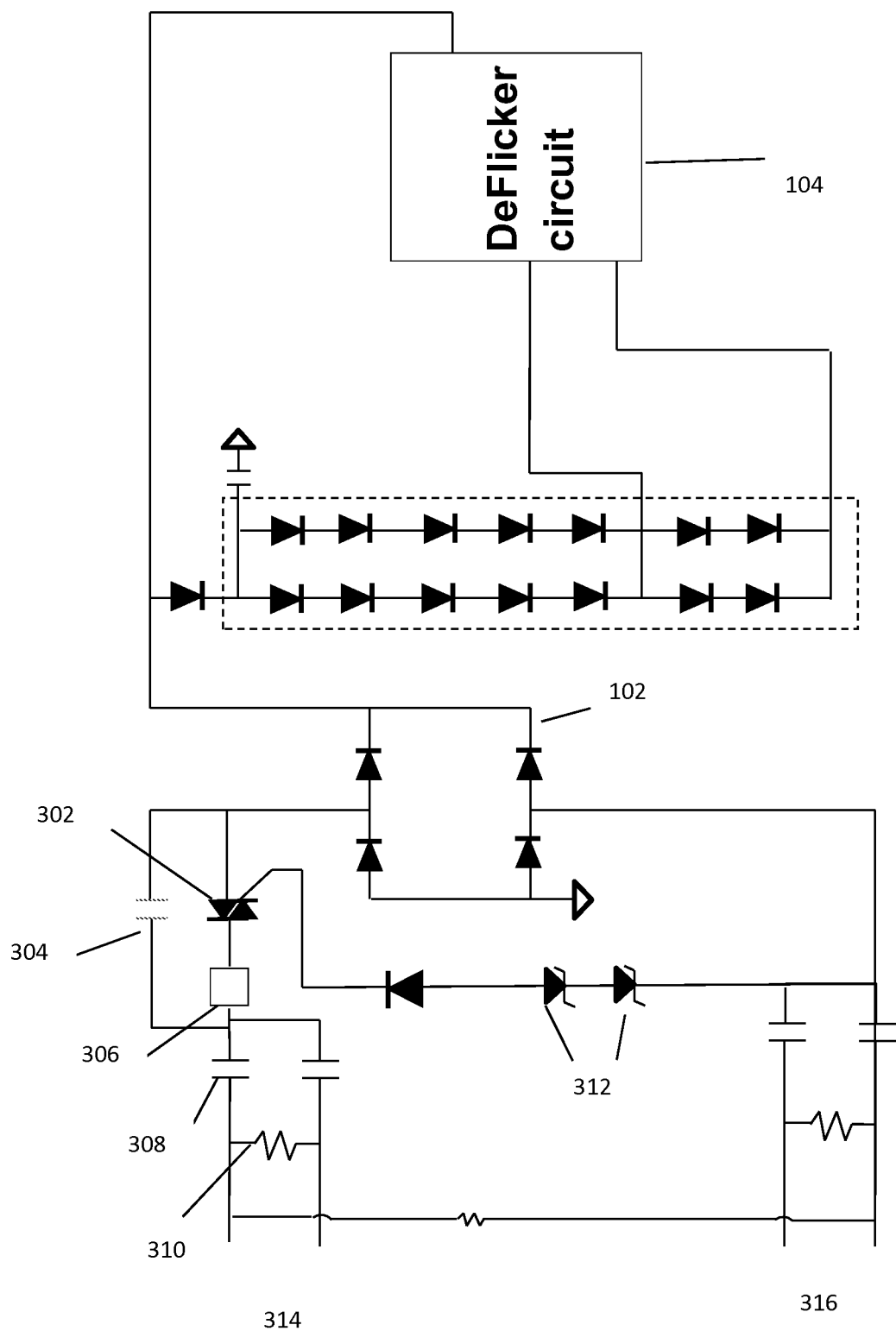
FIG. 3 illustrates a LED retrofit lamp circuit with a reactive coupling to the ballast in accordance with an embodiment of the present invention.

FIG. 3 illustrates a LED retrofit lamp circuit with a reactive coupling to the ballast in accordance with an embodiment of the present invention. The reactive coupling comprises a TRIAC 302 driven by a SIDAC (silicon diode for alternating current) 306 and a current limiting resistor, wherein the main terminal of the TRIAC (triode for alternating current) 302 is connected to the bridge rectifier 102 and to the SIDAC 306. The SIDAC 306 is receiving the input voltage from the first terminal connection 314 of the ballast and the voltage of SIDAC 306 is set to approximately 220V DC. The gate terminal of TRIAC 302 is connected to a Zener diode 312 that regulates the flow of current across the TRIAC 302. The Zener diode 312 receives the current from second input terminal connection 316 of the ballast and conducts the current to the gate terminal of the TRIAC 302 when the current reaches a threshold value. For low frequency ballast, i.e. ballast operating at 60 Hz frequency, the SIDAC 306 triggers at a threshold frequency which causes the TRIAC 302 to be open circuit for approximately 25% of the half cycle reducing current flow in the ANSI reference ballast with its 60 Hz sinusoidal waveform @ 220V rms. In an actual magnetic ballast, voltage increases much more rapidly when the TRIAC is open circuit allowing it to exceed 220V within about 15 micro second (0.1% of the half cycle) making its impact inconsequential.

For high frequency ballast that operates at frequency of 25 kHz, the Zener 312 voltage is set to a level that the 220V rms ANSI ballast will not achieve (i.e. >315V) and put a capacitor 304 in parallel to the TRIAC 302 such that the TRIAC remains open circuit and the conducting current can be controlled with the parallel capacitor 304; in a real ballast, the input voltage exceeds 315V, the TRIAC is turned on and a separate conduction path is enabled. A capacitor 308 is placed in series with each of the input terminal connection of the lamp and a resistor 310 is used to short the two pins of single phase.

In another embodiment of the present invention a method to align frequency and phase to avoid audible noise and flicker is provided. When working with magnetic ballasts to enable dimming using the deflickerizer circuit, it is necessary to align frequency to the ballast frequency (typically 50 or 60 Hz) to avoid audible noise coming out of the ballast. Once frequency is aligned it is also necessary to maintain phase to avoid a low frequency interference wave which may show up as flicker to the user. The method for aligning the frequency and phase using deflickerizer circuit comprises: completing an edge detection of the incoming waveform to measure frequency; calculating the required PWM duty cycle as a function of external diming signal, temperature diming and deflickerizing dimming; asserting the FET voltage for the required period in order to create the designed output level; repeating with each cycle of the magnetic ballast.

The foregoing merely illustrates the principles of the present invention. Other variations to the disclosed embodiments can be understood and effected by those skilled in the art in practicing the claimed invention from a study of the drawings, the disclosure, and the appended claims. In the claims, the word "comprising" does not exclude other elements or steps and the indefinite article "a" or "an" does not exclude a plurality. The mere fact that certain measures are recited in mutually different dependent claims does not indicate that a combination of these measures cannot be used advantageously. Any reference signs in the claims should not be construed as limiting the scope of the claims. Various modifications and alterations to the described embodiments will be apparent to those skilled in the art in view of the teachings herein. It will thus be appreciated that those skilled in the art will be able to devise numerous techniques which, although not explicitly described herein, embody the principles of the present invention and are thus within the spirit and scope of the present invention. All references cited herein are incorporated herein by reference in their entireties.

We claim:

1. A retrofit LED lamp adapted to work on a ballast comprising:
   a plurality of input pins at the end of the retrofit lamp for connection to a first and a second lamp connection terminal of a ballast;
   a bridge rectifier connected to the first and second lamp terminal connection of the ballast, wherein the bridge rectifier converts the alternating current supplied by the AC ballast to the direct current required for an LED array;
   an LED array connected to the output terminal of the bridge rectifier by a reactive coupling;
   a deflickerizer circuit connected to the LED array to prevent the appearance of flicker in the retrofit LED lamp when the alternating current frequency is in the range of 0.5 Hz to 60 Hz, wherein the deflickerizer circuit comprises a low dropout regulator, a plurality of op amplifiers, a plurality of resistors and capacitors, a FET.

2. The retrofit LED lamp of claim 1 wherein the bridge rectified is made of schottky diodes.

3. The retrofit LED lamp of claim 1 wherein the deflickerizer circuit shorts the light-emitting diode array.

4. The retrofit LED lamp of claim 1 wherein the deflickerizer circuit measures the current being delivered to the LED array.

5. The retrofit LED lamp of claim 1 wherein the FET in the deflickerizer circuit is a MOSFET.

6. The retrofit LED lamp of claim 1 wherein the FET of the deflickerizer circuit shorts out the LED array with a PWM signal on measuring the current.

7. The retrofit LED lamp of claim 6 wherein the PWM signal is in the range of 100 Hz to 10 kHz.

8. The retrofit LED lamp of claim 1 wherein deflickerizer circuit adjusts the duty cycle of PWM circuit in real time in response to change in ballast current.

9. The retrofit LED lamp of claim 1 wherein the reactive coupling comprise a TRIAC driven by a SIDAC, a current limiting resistor, a capacitor placed in parallel to the TRIAC, such that the gate terminal of the TRIAC is connected to a Zener diode that receives input from the second terminal connection of the ballast.

10. The retrofit LED lamp of claim 9 wherein for low frequency ballast, the SIDAC triggers at a threshold frequency which causes the TRIAC to be open circuit for approximately 25% of the half cycle reducing current flow in the ANSI reference ballast with its 60 Hz sinusoidal waveform @ 220V rms.

11. The retrofit LED lamp of claim 9 wherein for high frequency ballast, the Zener diode voltage is set to a level that the 220V rms ANSI ballast will not achieve (i.e. >315V) such that the TRIAC remains an open circuit and the conducting current can be controlled with the parallel capacitor.

12. The retrofit LED lamp of claim 1 wherein the deflickerizer circuit maintains the phase while aligning frequency to avoid low frequency interference.

13. The retrofit LED lamp of claim 1 wherein the deflickerizer circuit completes an edge detection to measure the frequency of coming waveform for each cycle of the ballast.

14. The retrofit LED lamp of claim 1 wherein the deflickerizer circuit calculates a required PWM duty cycle as a function of external diming signal, temperature diming and deflickerizing dimming for each cycle of the ballast.

15. The retrofit LED lamp of claim 1 wherein the deflickerizer circuit asserts the FET voltage for the required period in order to create the designed output level for each cycle of the ballast.

* * * * *